United States Patent
Meyer et al.

(10) Patent No.: US 11,378,132 B2
(45) Date of Patent: Jul. 5, 2022

(54) DRIVER-DRIVEN CONNECTION HAVING MULTIPLE ELECTRO-MAGNETICALLY FORMED JOINTS

(71) Applicant: THE BOEING COMPANY, Chicago, IL (US)

(72) Inventors: Mark R. Meyer, Edmonds, WA (US); Ben P. Hu, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 322 days.

(21) Appl. No.: 16/534,622

(22) Filed: Aug. 7, 2019

(65) Prior Publication Data
US 2021/0044196 A1 Feb. 11, 2021

(51) Int. Cl.
*F16D 1/072* (2006.01)
*B21D 26/14* (2006.01)
*B64C 13/28* (2006.01)

(52) U.S. Cl.
CPC ............. *F16D 1/072* (2013.01); *B21D 26/14* (2013.01); *B64C 13/28* (2013.01)

(58) Field of Classification Search
CPC ......... B21D 26/14; B64C 13/28; F16B 17/00; F16B 17/004; F16C 3/023; F16C 2626/06; F16C 2626/43; F16D 1/06; F16D 1/064; F16D 1/072; Y10T 74/2188; Y10T 403/49; Y10T 403/7026; Y10T 403/7028; Y10T 403/7035
USPC ........... 403/274, 359.1, 359.2, 359.6; 74/607
See application file for complete search history.

(56) References Cited

U.S. PATENT DOCUMENTS

| | | | | |
|---|---|---|---|---|
| 1,797,691 | A * | 3/1931 | Merrill | E04G 7/301 403/274 |
| 4,902,048 | A * | 2/1990 | Washizu | F16L 21/08 285/319 |
| 5,072,655 | A * | 12/1991 | Adler | F04B 1/124 403/274 |
| 5,536,100 | A * | 7/1996 | Kiefer | B21C 37/298 403/274 |
| 5,983,478 | A | 11/1999 | Dolan et al. | |
| 6,389,697 | B1 * | 5/2002 | Benoit | B21D 26/14 29/897.2 |
| 6,484,384 | B1 * | 11/2002 | Gibson | F16C 3/023 29/516 |
| 6,932,118 | B2 * | 8/2005 | Saha | F16D 1/104 138/109 |
| 7,363,945 | B2 | 4/2008 | Saha et al. | |

(Continued)

FOREIGN PATENT DOCUMENTS

| | | | | |
|---|---|---|---|---|
| DE | 2531263 A1 * | 1/1977 | | F16B 17/004 |
| DE | 2920899 A1 * | 1/1981 | | F16B 17/004 |

(Continued)

*Primary Examiner* — Josh Skroupa
(74) *Attorney, Agent, or Firm* — Marshall, Gerstein & Borun LLP (57) ABSTRACT

A torque tube assembly includes a torque tube, and a fitting attached to the torque tube by a first EMF joint and by a second EMF joint. The first EMF joint comprises a first plurality of torque lands formed proximate a first end of the torque tube and a first plurality of fitting lands formed proximate a first end of the fitting. The second EMF joint comprises a second plurality of torque lands formed distal to the first end of the torque tube and a second plurality of fitting lands formed distal to the first end of the fitting.

20 Claims, 4 Drawing Sheets

(56) References Cited

U.S. PATENT DOCUMENTS

| | | | |
|---|---|---|---|
| 9,500,304 B2 * | 11/2016 | Golovashchenko | .. F16B 17/004 |
| 9,739,316 B2 | 8/2017 | Schwartz et al. | |
| 2005/0051224 A1 | 3/2005 | Saha et al. | |

FOREIGN PATENT DOCUMENTS

| | | | | |
|---|---|---|---|---|
| DE | 102012201290 A1 * | 8/2013 | ................ | F16C 7/02 |
| WO | WO-9710907 A1 | 3/1997 | | |
| WO | WO-2019097072 A1 * | 5/2019 | ............ | F16B 17/004 |

* cited by examiner

DRIVER-DRIVEN CONNECTION HAVING MULTIPLE ELECTRO-MAGNETICALLY FORMED JOINTS

FIELD

The disclosure generally relates to driver-driven element connections and more specifically relates to a torque tube connection having multiple electro-magnetic (EMF) joints.

BACKGROUND

There are many uses of an elongated metal tube having end fittings connected to the tube with a rigid mechanical joint. Push rods and torque tubes are two very common uses of this type of device. Torque tubes are used for mechanically transmitting torque from a driver to a driven device through a tube. These applications often require that the torque tube be light and inexpensive, have high fatigue strength and an ultimate yield strength at the end fitting equal to or exceeding that of the tube itself. Drive shafts for vehicles such as cars and trucks are examples of a type of torque tube requiring such characteristics. Presently, vehicle drive shafts are made of steel tubing attached at their ends to torque coupling fittings such as universal joint (U-joint) components or the like. The use of aluminum tubing in a vehicle drive shaft would have an attractive weight saving benefit, but the difficulties of forming high strength aluminum tubing onto the end fittings without expensive preliminary heat treating has deterred the use of aluminum tubing in this application.

In aviation applications, the requirements for light weight mechanical systems have incentivized use of aluminum tubing for torque tubes. However, the apparatus and methods for attachment of the end fittings on these torque tubes have some unsatisfactory properties that manufacturers and operators of commercial transport airplanes would prefer to eliminate. Riveting the end fitting onto the tube is costly because it is labor intensive. The rivets can loosen after extensive service, resulting in lost motion and possibly resulting eventually in failure after many years unless the torque tube is inspected and repaired or replaced when the rivets begin to loosen.

Welding or brazing the tubing to the end fitting presents the difficulties of a heat affected zone adjacent the fused joint, and low tolerance fit-up requirements for the fitting and the tube. Crack propagation in the fused joint can also be a problem; it may be difficult to detect by ordinary inspection procedures, and failures that do occur may be catastrophic and result in failure of flight critical control surfaces. Therefore, welding or brazing is rarely used in load-bearing flight critical hardware.

Mechanically forming the tubing onto the end fitting is a promising technique because it does not require fasteners nor produce the heat affected zone of a fused joint. Some potentially usable techniques for exerting pressure on the aluminum tubing to deform it around the end fitting for this purpose are swaging, hydroforming, rubber press forming, electromagnetic forming, and explosive forming. Electromagnetic forming is especially appealing because of the potential for efficient, high volume, precisely repeatable production processes, but existing apparatus and techniques to deform aluminum tubing materials possessing the required properties of high strength and corrosion cracking resistance have resulted in formation of cracks in the tubing during forming onto the end fitting. The resulting cracks are unacceptable because of the shortening of the fatigue life of the torque tube.

Electromagnetically pulse forming 2024 aluminum tubing in a T-3 condition onto end fittings disclosed in U.S. Pat. No. 4,523,872 using an "exploding coil" for electromagnetically forming the 2024 aluminum was time consuming, because a new coil was needed for each forming operation. The exploding coil literally burst like a hand grenade, creating a shower of copper wire fragments that required careful shielding to prevent injury to the workers, and to protect them from the loud noise involved in the operation.

The production equipment used to form the tubing around the end fittings must be durable, repeatable and accurate. That is, it must be capable of producing many parts without wear or need for adjustment. The parts it produces must always be the same for a given setting of the equipment, and the equipment must be capable of easily, quickly and accurately indexing the parts to be formed in exactly the same place so they are positioned accurately with respect to each other and with respect to the equipment each time a torque tube is made. Likewise, the components of the equipment must be accurately positioned relative to each other the same way each time the tube is formed on an end fitting so that substantially identical torque tubes are made using identical settings of the equipment and acting on identical parts.

In some applications, the angular relationship between driver and driven element can cause traditional electromagnetic joints to fail due to an induced bending stress between the driver and the driven element. There is a need for an improved EMF joint that can handle the induced bending stress due to angled u-joint connections.

SUMMARY

In one example, a torque tube assembly comprises a torque tube and a fitting attached to the torque tube by a first EMF joint and by a second EMF joint. The first EMF joint comprises a first plurality of torque lands formed proximate a first end of the torque tube and a first plurality of fitting lands formed proximate a first end of the fitting. The second EMF joint comprises a second plurality of torque lands formed distal to the first end of the torque tube and a second plurality of fitting lands formed distal to the first end of the fitting.

In another example, a method of forming a double EMF joint in a torque tube assembly comprises inserting a fitting into one end of a torque tube, the fitting including a first plurality of fitting lands and a second plurality of fitting lands, and applying an electro-magnetic field to the torque tube to form a first plurality of torque lands adjacent to the first plurality of fitting lands and to form a second plurality of torque lands adjacent to the second plurality of fitting lands.

In other examples, the torque tube assembly, or the method of forming a torque tube assembly, may include one or more of the following forms.

In one form, the first plurality of torque lands comprises a first ring of torque lands that are distributed circumferentially about the torque tube and the first plurality of fitting lands comprises a first ring of fitting lands that are distributed circumferentially about the fitting, the first ring of torque lands being located adjacent to the first ring of fitting lands.

In another form, the second plurality of torque lands comprises a second ring of torque lands that are distributed circumferentially about the torque tube, and the second plurality of fitting lands comprises a second ring of fitting lands that are distributed circumferentially about the fitting, the second ring of torque lands being located adjacent to the second ring of fitting lands.

In yet another form, a first torque land in the first ring of torque lands is longitudinally aligned with a first torque land in the second ring of torque lands.

In yet another form, a first torque land in the first ring of torque lands is longitudinally offset from a first torque land in the second ring of torque lands.

In yet another form, at least one torque land in the first plurality of torque lands includes a groove, and at least one fitting land in the first plurality of fitting lands includes a groove.

In yet another form, at least one torque land in the second plurality of torque lands includes a groove, and at least one fitting land in the second plurality of fitting lands includes a groove.

The features, functions, and advantages that have been discussed can be achieved independently in various embodiments or may be combined in yet other embodiments further details of which can be seen with reference to the following description and drawings.

DESCRIPTION

Figure 1:
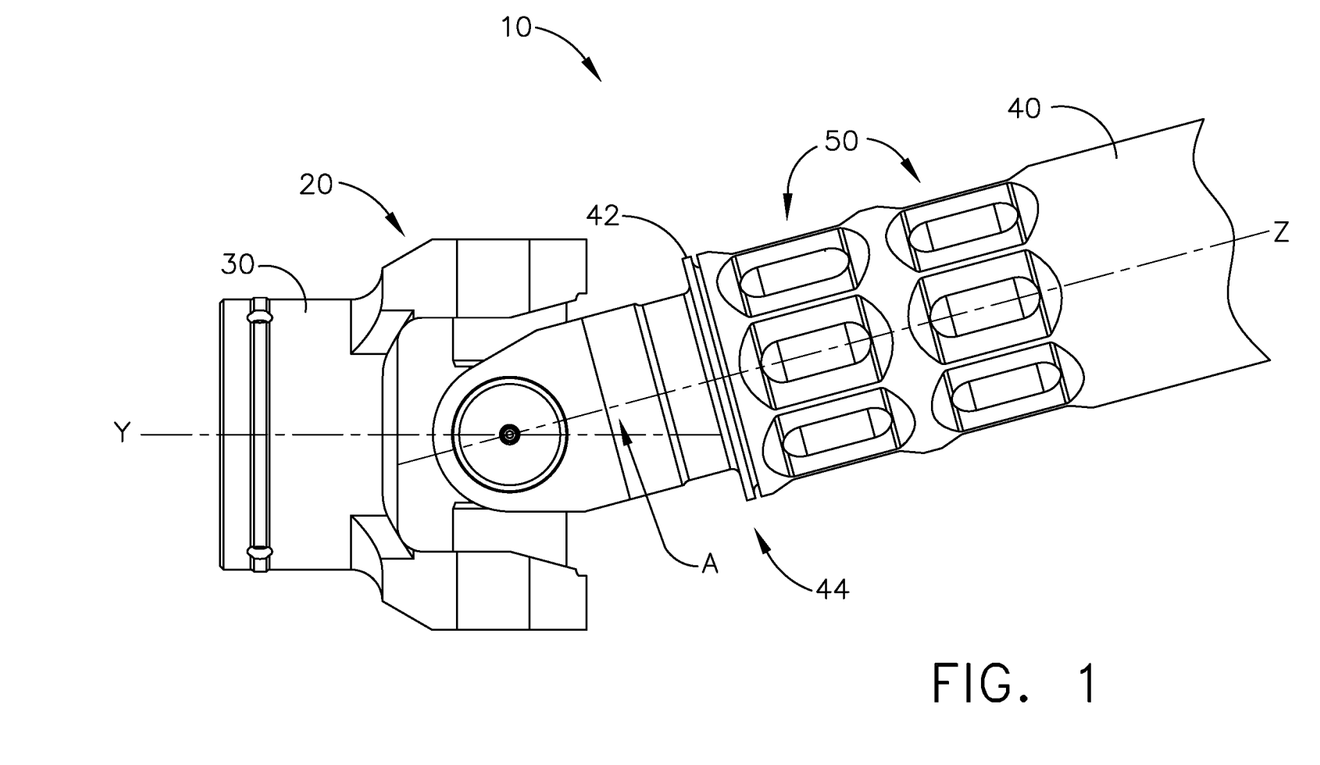
FIG. 1 is a side view of a torque tube assembly having a multiple EMF joint, the torque tube assembly being connected to a universal joint.
Figure 2:
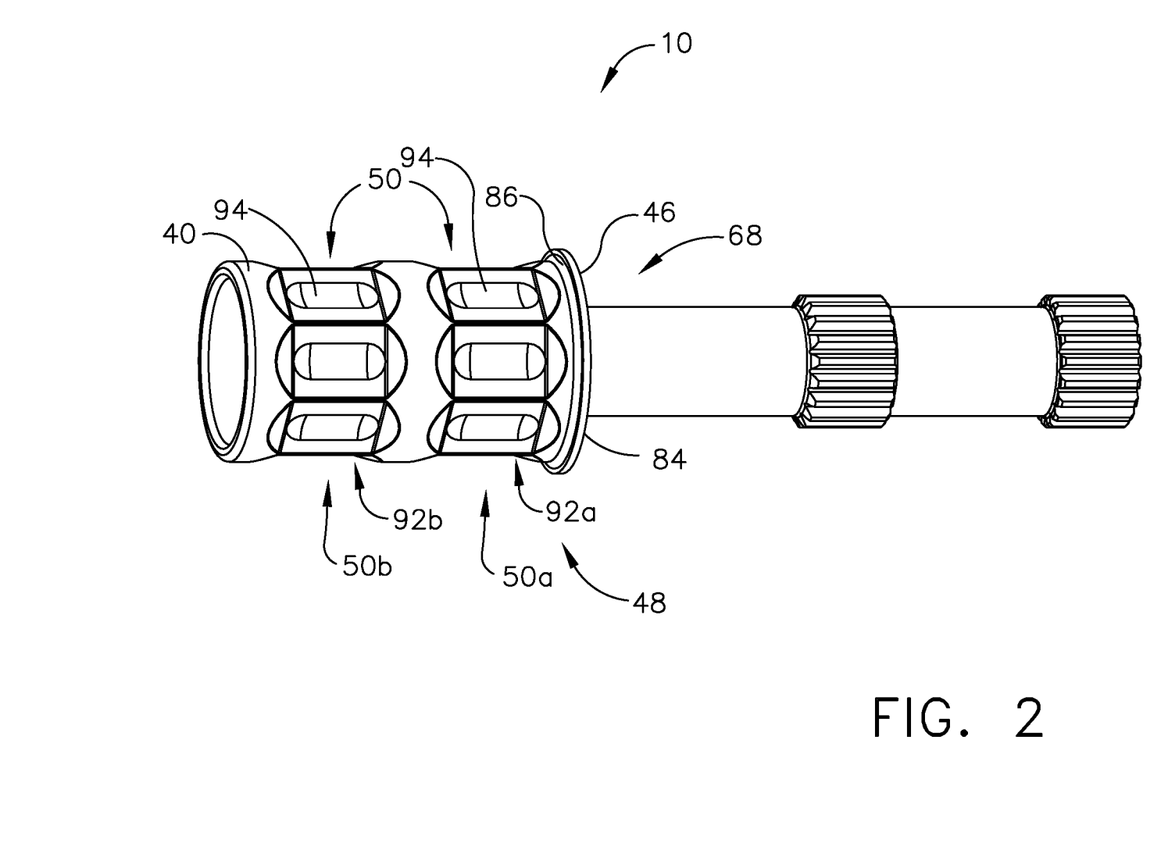
FIG. 2 is a close up end view of the torque tube and fitting of the torque tube assembly of FIG. 1.

Turning now to FIG. 1, a torque tube assembly 10 is operably connected to a universal joint 20. A driven element, which in the illustrated embodiment is a tubular member 30, is also operably connected to the universal joint 20 so that rotation from the torque tube assembly 10 may be transferred to the tubular member 30 through the universal joint 20. The torque tube assembly 10 may be driven directly by a motor (not shown) or by a drive shaft 11 (FIG. 3) that is connected to a motor. In some cases, the driven element may be an actuator for an aircraft wing flap or slat actuating system. The torque tube assembly 10 includes a torque tube 40 and a first fitting 42 at a first end 44 of the torque tube 40. As illustrated in FIG. 2, in some embodiments, a second fitting 46 is disposed at a second end 48 of the torque tube 40. In the illustrated embodiment, the first fitting 42 is operably connected to the universal joint 20. In other embodiments, the second fitting 46 may be operably connected to the universal joint 20. In yet other embodiments both the first fitting 42 and the second fitting 46 may be connected to universal joints.

The torque tube 40 and the tubular member 30 are angled relative to one another by angle A. Angle A is defined as the angle between a longitudinal axis Z of the torque tube 40 and a longitudinal axis Y of the tubular member 30. The angular relationship may be needed due to spatial requirements in a vehicle, such as in an aircraft wing. Angle A is greater than or equal to about 5 degrees. The angular relationship between the torque tube 40 and the tubular member 30 imparts increased bending moments to the torque tube assembly 10 that can cause traditional EMF joints to fail. The torque tube assembly 10 described herein includes a double EMF joint 50 at the first end 44 of the torque tube 40 and/or at the second end 48 of the torque tube 40 (FIG. 2). The double EMF joints described herein advantageously compensate for the increased bending moments of angled connections.

In some embodiments, the torque tube 40 comprises 2024 aluminum, although other materials can be used, depending on the anticipated maximum loads, fatigue life and chemical environment the torque tube can be expected to encounter. The first fitting 42 is fixed in the first end 44 of the torque tube 40 by forming the torque tube 40 around the first fitting 42. Similarly, the second fitting 46 is fixed in the second end 48 of the torque tube 40 by forming the torque tube 40 around the second fitting 46. A host of forming techniques are known and could be used for this purpose, such as swaging, hydroforming, explosive forming, etc. However, in one embodiment, the manufacturing technique for fixing the first fitting 42 and/or the second fitting 46 in the torque tube 40 is electromagnetic pulse forming, which requires electrical conductivity, by the material itself or by a conductive sleeve, in which eddy currents can be magnetically induced in the forming process. If a conductive sleeve is used over a tube of material such as stainless steel having lower conductivity, the discussion below regarding the generation of opposing magnetic fields in the tube pertains to the conductive sleeve.

In one embodiment, the first fitting 42 and/or the second fitting 46, are preferably made of 15-5 stainless steel having 15% chromium, 5% nickel, 4% copper and the balance iron with less than about 1% carbon. In other embodiments, other materials could be used for the first fitting 42 and/or the second fitting 46, but 15-5 stainless steel has an advantageous combination of corrosion resistance, machinability and strength.

With respect to the structural aspects of the double EMF joints 50, the first fitting 42, the second fitting 46, and the torque tube 40, the description below with respect to the second fitting 46 and the EMF joint 50 at the second end 48 of the torque tube 40 applies equally to the first fitting 42 and the EMF joint 50 at the first end 44 of the torque tube 40. Thus, the discussion of the first fitting 42 and the EMF joint 50 at the first end 44 of the torque tube 40 is omitted in the interest of brevity.

Figure 3:
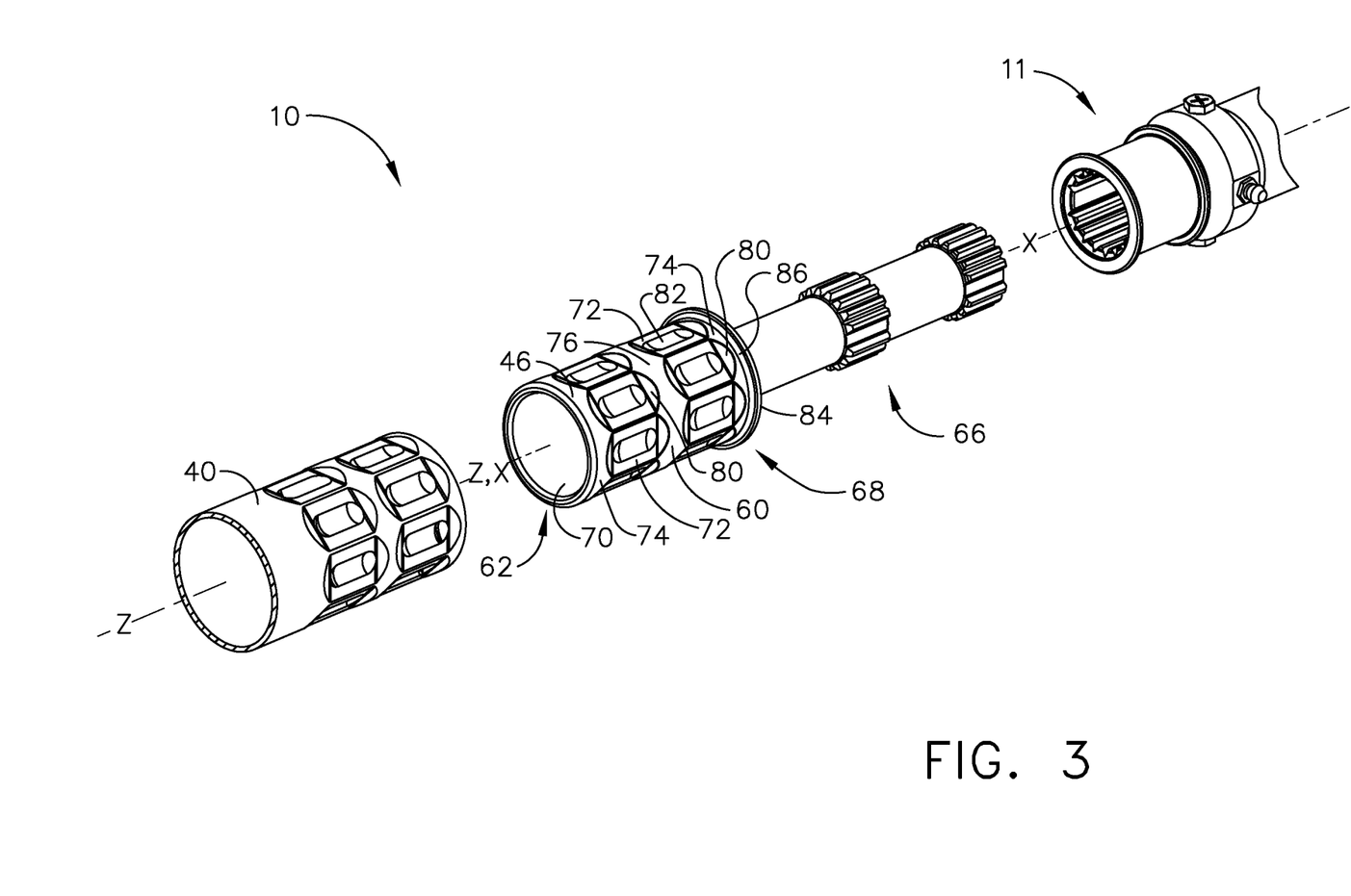
FIG. 3 is an exploded perspective view of the torque tube assembly of FIG. 1.

Turning now to FIGS. 2 and 3, the second fitting 46 has a tubular body 60 having an inner axial end 62 and a longitudinal axis X which, in the assembled torque tube 40, is coincident with the longitudinal axis Z (FIG. 1) of the torque tube 40. A torque coupling 66 is integral with the second fitting 46 at an outer axial end 68 of the tubular body 60. An axial bore 70 (FIG. 4) extends through the tubular body 60, and may be beveled at each end to save weight.

Figure 4:
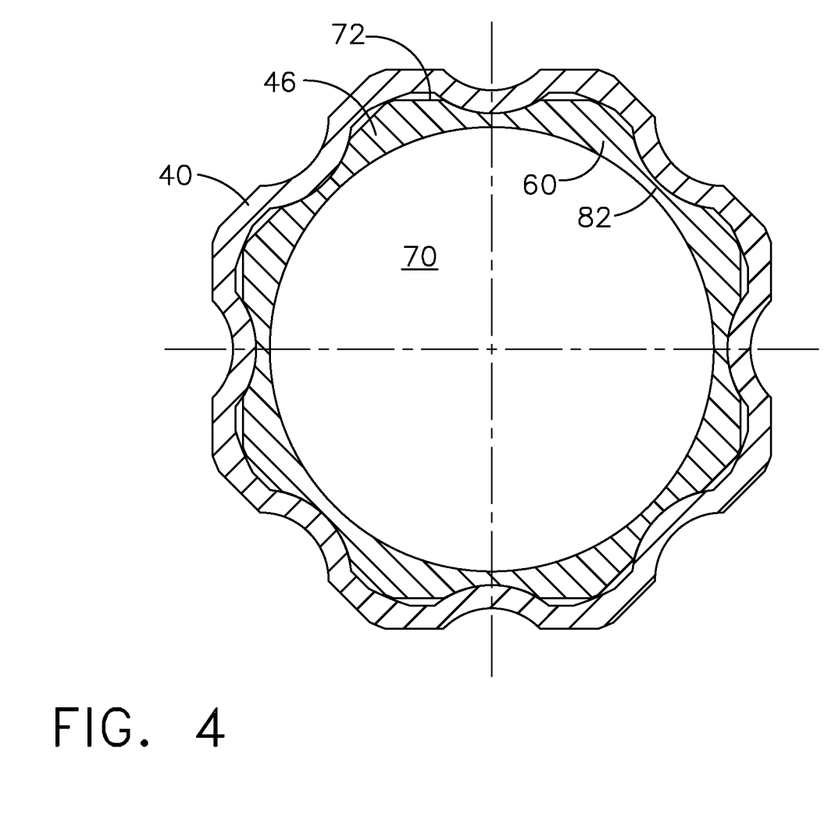
FIG. 4 is a cross-sectional view of the torque tube and fitting of the torque tube assembly of FIG. 1.

As shown best in FIGS. 3 and 4, twelve flat lands 72 (two sets of six flat lands 72) are milled onto the surface of the tubular body 60, forming a cross section approximately in the form of a regular polygon, preferably a hexagon, as illustrated in FIG. 4. The flat lands 72 terminate axially short of both ends of the tubular body 60, leaving the two end portions of the tubular body 60, each in the form of a circular cross-section cylinder extending axially slightly beyond the hexagonal center section, providing two end supporting surfaces 74 and a center supporting surface 76 for the torque tube 40 on both axial ends of the flat lands 72 when the torque tube 40 is electromagnetically pulse formed down into the flat lands 72.

The axial ends of the flat lands 72 blend onto the supporting surfaces 74 and 76 with sloping shoulders 80, lying at an angle of between 30-55 degrees, preferably about 45 degrees from the horizontal, around which the 2024 aluminum of the torque tube 40 can be formed in the T-3 condition without cracking. Electromagnetically forming the torque tube 40 onto the second fitting 46 establishes two torque transmitting EMF joints 50 between the second fitting 46 and the torque tube 40 that are stronger than a constant cross section detail of the torque tube 40 itself for carrying axial, torsion, and bending loads. Axial load transmission between the torque tube 40 and the second fitting 46 is established by engagement of the shoulders 80 on the second fitting 46 with portions of the torque tube 40 formed over the shoulders 80.

A groove 82 is milled into the flat face of each land 72. The groove 82 may comprise a circular cross-section groove cut with a spherical end cutter. The groove 82 provides a runout region for the torque tube 40 to expand into when it is electromagnetically formed around the second fitting 46 so the torque tube 40 does not rebound away from the flat face of the lands 72 by springback or reflection. This ensures that the tube material remains under slight tension after it is formed around the second fitting 46, so the tube material retains a slight hoop stress and maintains a tight torsional joint on the second fitting 46.

The shape of the groove 82 should be conducive to receiving the tube material as it is impulse formed onto the second fitting 46 and should avoid any sharp bends or folds of the material when the tube material forms down into the grooves 82. The radius of curvature of the circular groove 82 is preferably greater than about 10% of the radius of the axial bore 70, and less than one third of the point-to-point dimension of the face of the hexagonal surface in which the groove 82 is formed. These proportions militate for a groove 82 that is big enough to receive the runout of the torque tube 40 when it forms down against the second fitting 46 without a sharp bend at the edge of the groove 82 and without excessively thinning the floor of the groove 82.

An enlarged diameter step 84 on the tubular body 60 forms a shoulder 86 with the tubular body 60 at the junction with the cylindrical supporting surface 74. When the second fitting 46 is inserted into the torque tube 40, the tubular body 60 slides all the way into the torque tube 40 until the torque tube 40 engages the shoulder 86.

As illustrated in FIG. 2, which shows the torque tube 40 engaged with the second fitting 46, the torque tube assembly 10 comprises a first EMF joint 50a and a second EMF joint 50b. The first EMF joint 50a comprises a first plurality of torque lands 92a formed proximate the second end 48 of the torque tube 40. The first plurality of torque lands 92a overlays a first plurality of fitting lands (not shown in FIG. 2, but in the disclosed embodiment, the fitting lands are the flat lands 72 illustrated in FIG. 3) formed proximate the outer axial end 68 (a first end) of the second fitting 46. The first plurality of torque lands 92a are drawn into the first plurality of fitting lands during the electromagnetic forming process. Similarly, the second EMF joint 50b comprises a second plurality of torque lands 92b formed distal to the second end 48 of the torque tube 40. The second plurality of torque lands 92b overlays a second plurality of fitting lands (not shown in FIG. 2, but in the disclosed embodiment, the fitting lands are the flat lands 72 illustrated in FIG. 3) formed distal to the outer axial end 68 (the first end) of the first fitting 42. When the torque tube 40 is electromagnetically formed onto the second fitting 46, torque grooves 94 are formed in the torque lands 92a, 92b, mirroring the grooves 82 in the first fitting 42.

The illustrated embodiment, the first plurality of torque lands 92a comprises a first ring of torque lands 92a that are distributed circumferentially about the torque tube 40 and the first plurality of fitting lands 72 comprises a first ring of fitting lands 72 that are distributed circumferentially about the second fitting 46, the first ring of torque lands 92a being located adjacent to the first ring of fitting lands 72.

Similarly, the second plurality of torque lands 92b comprises a second ring of torque lands 92b that are distributed circumferentially about the torque tube 40 and the second plurality of fitting lands 72 comprises a second ring of fitting lands 72 that are distributed circumferentially about the second fitting 46, the second ring of torque lands 92a being located adjacent to the second ring of fitting lands 72.

In the embodiment illustrated in FIG. 2, the torque lands 92a, 92b are longitudinally aligned. In other words, a first torque land in the first ring of torque lands 92a is longitudinally aligned with a first torque land in the second ring of torque lands 92b.

In other embodiments, the torque lands 92a, 92b may be longitudinally offset. In other words, a first torque land in the first ring of torque lands 92a may be longitudinally offset from a first torque land in the second ring of torque lands 92b.

The double EMF joints described above are formed by inserting the second fitting 46 into one end of the torque tube 40 and applying an electro-magnetic field to the torque tube 40 to form the first plurality of torque lands 92a adjacent to the first plurality of fitting lands 72 and to form the second plurality of torque lands 92b adjacent to the second plurality of fitting lands 72.

Forming two EMF joints in the torque tube assembly 10 advantageously allows the connection to counter increased bending moments experienced by the torque tube assembly 10 when the torque tube assembly is connected to a U-joint and the torque tube 40 and the driven element are angled longitudinally by more than about 5 degrees. In one embodiment, the double EMF joint provides a 51% drop in material stress relative to a single EMF joint when the joints are subjected to 1000 in-lb of torque, 200 in-lb bending, and 500 lb tension. In another embedment, the double EMF joint provides a 28.5% drop in stress relative to a single EMF joint when the joints are subjected to 1000 in-lb torque and 500 lb tension. In yet another embodiment, the double EMF joint provides a 44% drop in material stress relative to a single EMF joint when the joints are subjected to 200 in-lb bending. The double EMF joint produces a significant advantage when the joint is subjected to bending moments.

The joints and assemblies described herein may be formed by the methods and machines described in U.S. Pat. No. 5,983,478, which is hereby incorporated by reference herein.

While various embodiments have been described above, this disclosure is not intended to be limited thereto. Variations can be made to the disclosed embodiments that are still within the scope of the appended claims.

What is claimed:
1. A torque tube assembly comprising:
   a universal joint,
   a torque tube,
   a fitting attached to the torque tube by a first EMF joint spaced apart from a second EMF joint, wherein:
      the first EMF joint comprises a first plurality of torque lands formed proximate a first end of the torque tube and a first plurality of fitting lands formed proximate a first end of the fitting, the second EMF joint comprises a second plurality of torque lands formed distal to the first end of the torque tube and a second plurality of fitting lands formed distal to the first end of the fitting, the first plurality of torque lands are positioned circumferentially about the torque tube and the second plurality of torque lands are positioned circumferentially about the torque tube, such that the first plurality of torque lands are positioned spaced apart, along the torque tube, from the second plurality of torque lands, the first plurality of fitting lands are positioned circumferentially about the fitting and the second plurality of fitting lands are positioned circumferentially about the fitting, such that the first plurality of torque lands are positioned spaced apart, along the fitting, from the second plurality of fitting lands, the fitting and the torque tube are connected to the universal joint, and the fitting has a longitudinal axis and the torque tube has a longitudinal axis such that with the longitudinal axis of the torque tube and the longitudinal axis of the fitting are coincident, and a tube member is connected to the universal joint, such that rotation of the torque tube is transferred to the tube member through the universal joint, wherein a longitudinal axis of the tube member forms an angle with the longitudinal axis of the torque tube and the longitudinal axis of the fitting.

2. The torque tube assembly of claim 1, wherein the first plurality of torque lands comprises a first ring of torque lands that are distributed circumferentially about the torque tube and the first plurality of fitting lands comprises a first ring of fitting lands that are distributed circumferentially about the fitting, the first ring of torque lands being located adjacent to the first ring of fitting lands.

3. The torque tube assembly of claim 2, wherein the second plurality of torque lands comprises a second ring of torque lands that are distributed circumferentially about the torque tube and the second plurality of fitting lands comprises a second ring of fitting lands that are distributed circumferentially about the fitting, the second ring of torque lands being located adjacent to the second ring of fitting lands.

4. The torque tube assembly of claim 3, wherein a first torque land in the first ring of torque lands is longitudinally aligned with a first torque land in the second ring of torque lands.

5. The torque tube assembly of claim 3, wherein a first torque land in the first ring of torque lands is longitudinally offset from a first torque land in the second ring of torque lands.

6. The torque tube assembly of claim 1, wherein at least one torque land in the first plurality of torque lands includes a groove, and at least one fitting land in the first plurality of fitting lands includes a groove.

7. The torque tube assembly of claim 6, wherein at least one torque land in the second plurality of torque lands includes a groove, and at least one fitting land in the second plurality of fitting lands includes a groove.

8. The torque tube assembly of claim 1, wherein the torque tube is part of an aircraft wing flap or slat actuating system.

9. The torque tube assembly of claim 1, further comprising a universal joint attached to the fitting.

10. The torque tube assembly of claim 9, wherein the universal joint connects the fitting to a tubular member and longitudinal axes of the fitting and the tubular member intersect at an angle of about 5 degrees or more.

11. The torque tube assembly of claim 1, wherein the torque tube comprises aluminum and the fitting comprises steel.

12. A method of forming a double EMF joint in a torque tube assembly, the method comprising:
inserting a fitting into one end of a torque tube, the fitting including a first plurality of fitting lands and a second plurality of fitting lands, wherein:
the first plurality of fitting lands are positioned circumferentially about the fitting and the second plurality of fitting lands are positioned circumferentially about the fitting, such that the first plurality of torque lands are positioned spaced apart, along the fitting, from the second plurality of fitting lands, and
the torque tube includes a first plurality of torque lands are positioned circumferentially about the torque tube and the second plurality of torque lands are positioned circumferentially about the torque tube, such that the first plurality of torque lands are positioned spaced apart, along the torque tube, from the second plurality of torque lands, such that the first plurality of fitting lands and the first plurality of torque lands comprise a first EMF joint and the second plurality of fitting lands and the second plurality of torque lands comprise a second EMF joint, such that the first EMF joint and the second EMF joint are spaced apart from one another, and
applying an electro-magnetic field to the torque tube to form a first plurality of torque lands adjacent to the first plurality of fitting lands and to form a second plurality of torque lands adjacent to the second plurality of fitting lands, attaching the fitting to the torque tube such that a longitudinal axis of the fitting and a longitudinal axis of the torque tube are coincident,
connecting the torque tube and the fitting to a universal joint, and
connecting a tube member to the universal joint, such that rotation of the torque tube is transferred to the tube member through the universal joint, wherein a longitudinal axis of the tube member forms an angle with the longitudinal axis of the fitting and the longitudinal axis of the torque tube.

13. The method of claim 12, wherein at least one fitting land in the first plurality of fitting lands includes a groove.

14. The method of claim 12, wherein at least one fitting land in the second plurality of fitting lands includes a groove.

15. The method of claim 12, wherein a first fitting land in the first plurality of fitting lands is longitudinally aligned with a first fitting land in the second plurality of fitting lands.

16. The method of claim 12, wherein a first fitting land in the first plurality of fitting lands is longitudinally offset from a first fitting land in the second plurality of fitting lands.

17. The method of claim 12, wherein the first plurality of fitting lands comprises a ring of fitting lands that are distributed circumferentially about the fitting.

18. The method of claim 12, wherein the second plurality of fitting lands comprises a ring of fitting lands that are distributed circumferentially about the fitting.

19. The method of claim 12, wherein the torque tube comprises aluminum and the fitting comprises steel.

20. A torque tube assembly comprising:
a universal joint;
a torque tube, a fitting attached to the torque tube by a first EMF joint and by a second EMF joint, the fitting connecting the torque tube to the universal joint, wherein:
  the first EMF joint comprises a first plurality of torque lands formed proximate a first end of the torque tube and a first plurality of fitting lands formed proximate a first end of the fitting,
  the second EMF joint comprises a second plurality of torque lands formed distal to the first end of the torque tube and a second plurality of fitting lands formed distal to the first end of the fitting,
  the first plurality of torque lands are positioned circumferentially about the torque tube and the second plurality of torque lands are positioned circumferentially about the torque tube, such that the first plurality of torque lands are positioned spaced apart, along the torque tube, from the second plurality of torque lands,
  the first plurality of fitting lands are positioned circumferentially about the fitting and the second plurality of fitting lands are positioned circumferentially about the fitting, such that the first plurality of torque lands are positioned spaced apart, along the fitting, from the second plurality of fitting lands,
the fitting and the torque tube are connected to the universal joint, and a tube member is connected to the universal joint, wherein:
  the tube member has a longitudinal axis such that the fitting and torque tube extend out of alignment with the longitudinal axis of the tube member, and
  the universal joint, the torque tube, and the fitting are part of an aircraft wing flap or slat actuating system.

\* \* \* \* \*